United States Patent
Marcatili

[11] 4,106,850
[45] Aug. 15, 1978

[54] OPTICAL FIBER WITH GRADED INDEX CORE AND PURE SILICA CLADDING

[75] Inventor: Enrique Alfredo José Marcatili, Rumson, N.J.

[73] Assignee: Bell Telephone Laboratories, Incorporated, Murray Hill, N.J.

[21] Appl. No.: 784,290

[22] Filed: Apr. 4, 1977

[51] Int. Cl.² .................................................. G02B 5/14
[52] U.S. Cl. .............................. 350/96.31; 350/96.34
[58] Field of Search ................ 350/96.31, 96.30, 96.34

[56] References Cited

U.S. PATENT DOCUMENTS

| | | | |
|---|---|---|---|
| 4,011,006 | 3/1977 | Fleming, Jr. .................... | 350/96.34 |
| 4,025,156 | 5/1977 | Gloge et al. .................... | 350/96.31 |
| 4,033,667 | 7/1977 | Fleming, Jr. .................... | 350/96.31 |

FOREIGN PATENT DOCUMENTS

2,546,162  9/1976  Fed. Rep. of Germany ........ 350/96.31

OTHER PUBLICATIONS

I. P. Kaminow and H. M. Presby "Ternary Fiber Glass Composition . . .", Optical Fiber Transmission II Conference, Feb. 22–24, 1977, Williamsburg, Virginia.

Primary Examiner—John K. Corbin
Assistant Examiner—Rolf Hille
Attorney, Agent, or Firm—Daniel D. Dubosky

[57] ABSTRACT

An optical fiber having three dopants in the core of the fiber and a pure silicon dioxide cladding is disclosed. Phosphorus pentoxide and germanium dioxide are radially graded in the core of an optical fiber to obtain minimum modal dispersion over a broad range of wavelengths. A uniform concentration of boron oxide is present throughout the core of the fiber in order to permit a pure silicon dioxide cladding without encountering any step discontinuity in the index of refraction at the core-cladding interface.

5 Claims, 5 Drawing Figures

OPTICAL FIBER WITH GRADED INDEX CORE AND PURE SILICA CLADDING

BACKGROUND OF THE INVENTION

This invention relates to multimode optical fibers and more particularly to multimode optical fibers wherein one or more dopants are radially graded throughout the core of the fiber in order to minimize the modal dispersion.

In the disclosure entitled "Ternary Fiber Glass Composition for Minimum Modal Dispersion Over a Range of Wavelengths" presented by I. P. Kaminow and H. M. Presby at the Optical Fiber Transmission II Conference, Feb. 22, through Feb. 24, 1977 at Williamsburg, Virginia, an optical fiber was described wherein phosphorus pentoxide and germanium dioxide are radially graded throughout the core of the optical fiber in order to obtain minimum modal dispersion over a broader range of wavelengths. An optical fiber of this type is also described in a copending patent application by Kaminow and Presby, Ser. No. 731,786, entitled "Silica Based Optical Fiber Waveguide Using Phosphorus Pentoxide and Germanium Dioxide", and filed on Oct. 12, 1976.

In the fiber disclosed by Kaminow and Presby, phosphorus pentoxide is caused to appear with maximum concentration on the axis of the core and this concentration is radially graded to zero at the core-cladding interface. The germanium dioxide on the other hand is caused to appear with zero molar concentration on the axis of the core and its concentration is radially graded to a maximum at the core-cladding interface. To avoid any step or discontinuity in the refractive index at the core-cladding interface, the fiber must also have a constant level of germanium dioxide a predetermined distance into the cladding of the fiber.

One of the more desirable techniques of manufacturing these type fibers is the modified chemical vapor deposition (MCVD) process. See the article entitled "A New Technique for the Preparation of Low-Loss and Graded-Index Optical Fibers", by J. B. MacChesney, P. B. O'Connor, and H. M. Presby, Proceedings of IEEE, Vol. 62 No. 9, pages 1280–1281, September, 1974. In order to provide a constant level of germanium dioxide in the cladding of the fiber, the silica tube utilized as a preform in the MCVD process would serve only as support inasmuch as a cladding layer with germanium dioxide must first be deposited on the wall of the tube. Only then can the dopants be radially graded in order to manufacture that part of the preform which serves as the core of the optical fiber. As a result, the fiber would be larger in cross-section than a fiber wherein the silica tube could serve as the cladding. A larger fiber is obviously less desirable since fewer fibers can then be utilized in the make up of any given cable diameter.

If the germanium dioxide is not continued into the cladding, the silica tube can serve as the cladding and a smaller fiber will necessarily result, but this fiber will have a step or discontinuity in the refractive index at the core-cladding interface. This step in the refractive index at the core-cladding interface will primarily effect the higher order modes in the waveguide. In fiber waveguides with a significant level of imperfections, these higher order modes will have larger radiation losses and as a result, have very little effect on the dispersion of the output pulse. If, however, the imperfections are kept to a minimum and a relatively good waveguide is manufactured, the higher order modes interact with this step at the core-cladding interface and arrive at the receiving end at a time which is significantly different from the arrival of the lower order modes, thereby resulting in increased pulse dispersion. Any filtering which could be performed to eliminate the higher order modes simply decreases the amount of energy received by the detector thereby adding to the undersirable attenuation of the system.

SUMMARY OF THE INVENTION

In accordance with the present invention one or more dopants can be radially graded in the core of a multimode fiber and the cladding of the fiber may be constructed of pure silica without introducing any discontinuity in the refractive index at the core-cladding interface. A uniform concentration of an appropriate index-decreasing or index-increasing dopant is deposited throughout the core of the fiber in an amount that changes the refractive index at the outer limits of the core to the refractive index of pure silicon dioxide.

In the above-identified previously disclosed optical fiber by Kaminow and Presby where phosphorus pentoxide and germanium dioxide are radially graded in the core of an optical fiber, boron oxide is added to the core in accordance with the present invention with uniform concentration throughout the core. This added boron oxide decreases the refractive index that would normally be present at the core-cladding interface in the Kaminow-Presby fiber to a value which is equal to the refractive index of pure silica.

BRIEF DESCRIPTION OF THE DRAWING

The invention will be more readily understood after reading the following detailed description in conjunction with the following drawings wherein.

DETAILED DESCRIPTION

Figure 1:
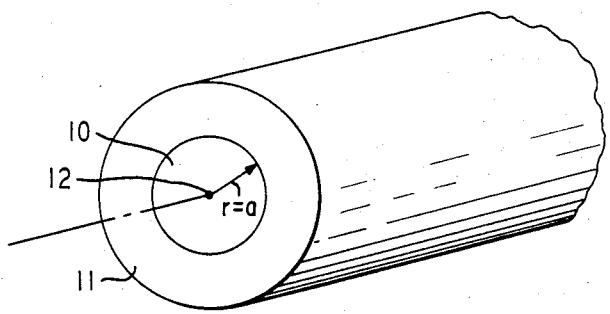
FIG. 1 is a pictorial representation of an optical fiber of the type which can utilize the present invention.

This invention relates to optical fiber waveguides of the type illustrated in FIG. 1. In these waveguides a core 10 centered around an axis 12 with a radius $a$ is surrounded by a cladding material 11. The cladding 11 is caused to have a lower index of refraction than the core material, thereby causing optical signals to propagate substantially within the core 10. As is well known to those skilled in the art, these fibers may be surrounded by protective materials and joined together into cables but these protective materials and other items surrounding the fiber for purposes of strength do not in any way relate to the present invention.

In the above-identified disclosure by H. M. Presby and I. P. Kaminow at the Optical Fiber Transmission II Conference, an optical fiber is proposed that will provide minimum modal dispersion over a broad range of wavelengths. This increase in the range of wavelengths is achieved by radially grading the core of the fiber with two index-increasing dopants. In accordance with the Kaminow-Presby invention, the two index-increasing dopants are reverse graded in that one of them appears with maximum concentration on the axis of the fiber whereas the other one appears with maximum concentration at the core-cladding interface. Specifically, as an example of a fiber that would practice the Kaminow-Presby invention, they disclosed a fiber doping of the type illustrated in FIG. 2 of the drawings.

Figure 2:
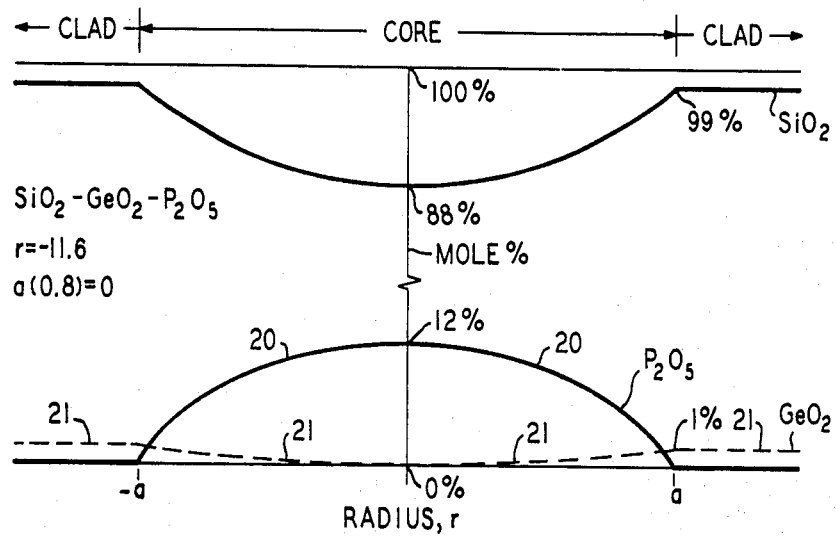
FIGS. 2 and 3 are graphs of molar percent and index of refraction versus radius for the above-identified prior art fiber disclosed by Kaminow and Presby.

In the fiber described by FIG. 2 phosphoruus pentoxide appears with a maximum molar concentration on the axis of the fiber as illustrated by curve 20, and radially grades to zero concentration at the core-cladding interface where the radius equals $a$. The other index-increasing dopant, germanium dioxide, appears with zero molar concentration on the axis of the fiber and is radially graded to a maximum at the core-cladding interface, as illustrated by curve 21 in FIG. 2. As further indicated in FIG. 2, silicon dioxide is the remaining constituent in both the core and cladding of the optical fiber. Even though both dopants are of the index-increasing type, the numerical aperture is degraded only slightly since the germanium dioxide need only appear with a maximum concentration equal to about 1/12 maximum concentration of the phosphorus pentoxide.

Figure 3:
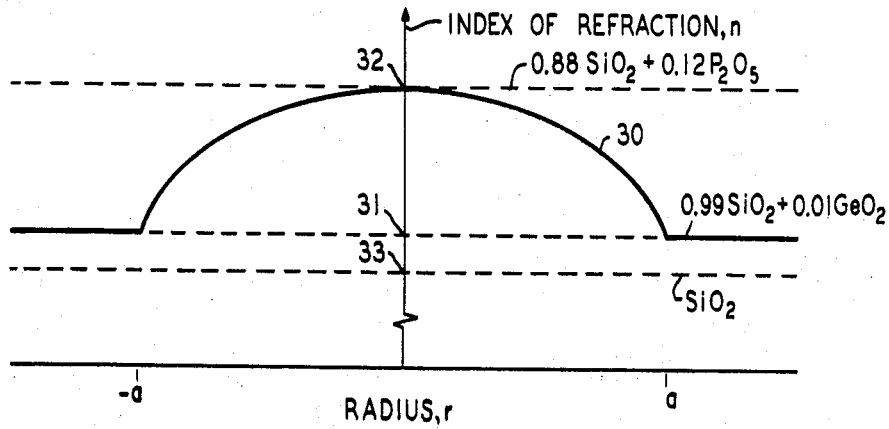

As pointed out hereinabove, it is desirable in high quality optical fiber to continue the germanium dioxide into the cladding of the fiber in order to avoid any discontinuity or step in the refractive index at the core-cladding interface. The resulting index of refraction in this type of fiber, whose doping profiles are shown in FIG. 2, is illustrated by curve 30 in FIG. 3. As shown in FIG. 3, the index of refraction 31 beyond a radius of $a$ is provided by a combination of silicon dioxide and germanium dioxide. Consequently, a cladding must be built in the side of a pure silica preform before the dopants for the core material are deposited in that preform. As pointed out hereinabove, this is disadvantageous in that a larger and more expensive fiber will necessarily result.

Figure 4:
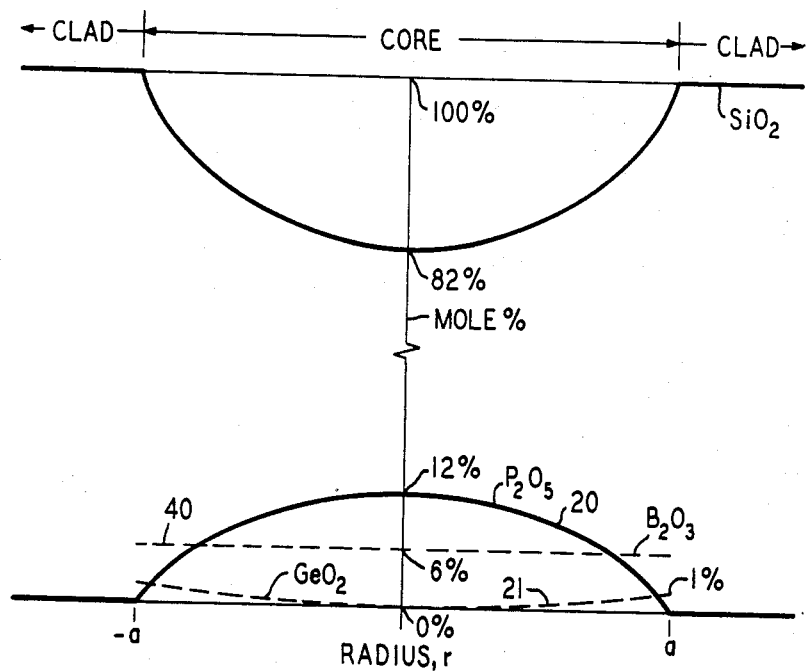
FIG. 4 is a graph of molar concentration versus radius for the dopants used in the construction of a fiber in accordance with the present invention.

In accordance with the present invention, the silica preform can serve as the cladding and an optical fiber can be constructed which will provide the same advantageous minimum modal dispersion over a broad range of wavelengths as in the fiber proposed by Kaminow and Presby. As indicated in FIG. 4, a fiber constructed in accordance with the present invention will still have one or more index-increasing dopants radially graded throughout the core of the fiber in order to provide minimum modal dispersion. In addition, however, the core of the fiber is also doped with a uniform concentration of an appropriate index-increasing or index-decreasing dopant that will remove the discontinuity in the index at the core-cladding interface.

Figure 5:
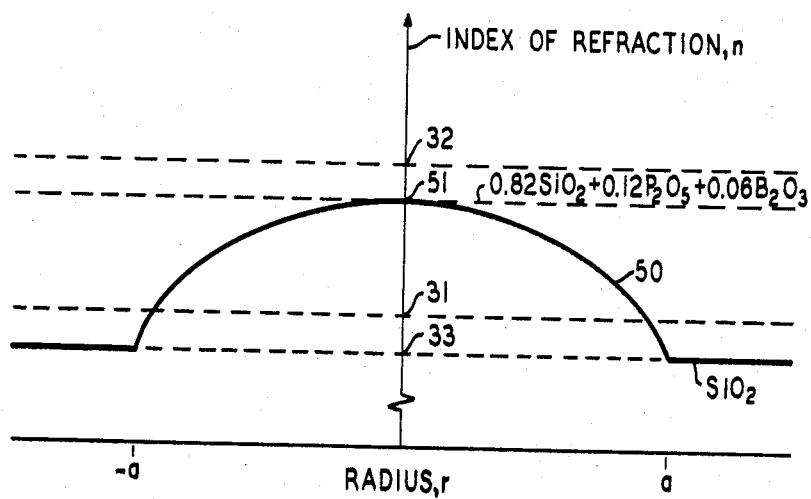
FIG. 5 is a graph of index of refraction versus radius for a fiber constructed in accordance with the present invention.

A specific application of the present invention to the fiber proposed by Kaminow and Presby has its doping profile illustrated in FIG. 4. In FIG. 4 phosphorus pentoxide and germanium dioxide are still radially graded throughout the core of the fiber in identically the same way as in the Kaminow-Presby fiber. A third dopant, boron oxide, is uniformly added throughout the core of the fiber as illustrated by curve 40 in FIG. 4. For the doping profiles proposed by Kaminow and Presby where the maximum concentration of germanium dioxide is approximately 1 percent at the core-cladding interface, a uniform concentration of about 6 percent of boron oxide is uniformly doped throughout the core of the fiber. As a result of this advantageous addition of a third dopant to the core of the fiber, the entire index profile for the core of the fiber is decreased in magnitude as illustrated in FIG. 5 of the drawings. As further indicated in FIG. 5, the amount of boron oxide added to the core is sufficient to decrease this index profile to the point where the index required at the core-cladding interface is equal to the refractive index of pure silicon dioxide. In terms of the numerals used to designate refractive index in FIGS. 3 and 5, the index profile is decreased by an amount equal to $(n_{31} - n_{33})$ where $n_{31}$ is equal to the index that would be present at the core-cladding interface without the boron oxide and $n_{33}$ is equal to the index of pure silicon dioxide.

It is to be understood by those skilled in the art that the above description is merely of one illustrative embodiment of the present invention. Numerous departures may be made by those skilled in the art without departing from the spirit and scope of this invention. For example, radially graded dopants other than phosphorus pentoxide and germanium dioxide could provide an index at the core-cladding interface that is different than the one percent provided by the germanium dioxide. In these cases an appropriate modification must be made in concentration of boron oxide deposited throughout the core of the fiber. Specifically, the amount of boron oxide required would be that which would provide a change in the refractive index at the core-cladding interface such that the index at this interface is equal to the index of pure silicon dioxide.

The broad aspects of the invention (that of adding a uniform concentration of dopant in order to eliminate a step in the refractive index at the core-cladding interface) is also applicable to fibers that would otherwise require an index-decreasing dopant such as boron oxide in the cladding, in order to prevent any step in the index. In the latter fibers a uniform concentration of index-increasing dopant such as germanium dioxide can be deposited throughout the core in order to remove the necessity of building a cladding in the preform. Such fibers are illustrated in other copending applications such as the one by D. C. Gloge et al, Ser. No. 612,625, entitled "Graded Index Fiber for Multimode Optical Communication", filed Sept. 12, 1975.

What is claimed is:

1. An optical fiber waveguide comprising a core surrounded by a cladding material having a generally lower index of refraction than said core, said core being composed of silica and two or more dopants that are radially graded in order to improve the dispersive characteristics of said fiber, characterized in that said core includes a third dopant appearing with uniform concentration through said core, and said cladding is substantially pure silica.

2. An optical fiber waveguide as defined in claim 1 wherein at least one of said two or more dopants that are radially graded in order to improve the dispersive characteristics of said fiber is an index-increasing dopant appearing with a predetermined concentration at the core-cladding interface, and said third dopant is an index-decreasing dopant appearing with sufficient concentration to cause the refractive index at the core-cladding interface to be equal to the refractive index of substantially pure silica.

3. An optical fiber waveguide as defined in claim 2 wherein said two or more dopants are phosphorus pentoxide and germanium dioxide, and said third dopant is boron oxide.

4. An optical fiber waveguide comprising a silica based fiber core surrounded by a cladding having an index of refraction lower in value than that of said core, first and second index-increasing dopants radially graded in concentration within said core, said first dopant being radially graded such that it appears with maximum molar concentration on the axis of said core and minimum molar concentration at the core-cladding interface, and said second dopant being radially graded such that it appears with maximum molar concentration at the core-cladding interface and with minimum molar concentration on the axis of said fiber core, characterized in that said core includes an index-decreasing dopant with uniform concentration throughout said core, and said cladding is substantially pure silica.

5. An optical fiber waveguide as defined in claim 4 wherein said first index-increasing dopant is phosphorus pentoxide, said second index-increasing dopant is germanium dioxide, and said index-decreasing dopant is boron oxide.